(12) United States Patent
Crane et al.

(10) Patent No.: US 10,187,515 B2
(45) Date of Patent: Jan. 22, 2019

(54) NETWORK INTERFACE DEVICES HAVING EXTERNAL DEMARCATION POINTS

(71) Applicant: Corning Optical Communications LLC, Hickory, NC (US)

(72) Inventors: Robert Alexander Crane, Keller, TX (US); Christian Shane Duran, Ft. Worth, TX (US); John Austin Keenum, Haltom City, TX (US); Rodger Alan Tenholder, Saginaw, TX (US)

(73) Assignee: Corning Optical Communications LLC, Hickory, NC (US)

( * ) Notice: Subject to any disclaimer, the term of this patent is extended or adjusted under 35 U.S.C. 154(b) by 430 days.

(21) Appl. No.: 14/836,161

(22) Filed: Aug. 26, 2015

(65) Prior Publication Data

US 2016/0065728 A1 Mar. 3, 2016

Related U.S. Application Data

(60) Provisional application No. 62/043,140, filed on Aug. 28, 2014.

(51) Int. Cl.
*H04M 1/74* (2006.01)

(52) U.S. Cl.
CPC .................... *H04M 1/745* (2013.01)

(58) Field of Classification Search
CPC ..... H04M 1/0291; H04Q 1/025; H04Q 1/028; H04Q 1/20

USPC .......................................... 379/325–332, 412
See application file for complete search history.

(56) References Cited

U.S. PATENT DOCUMENTS

| | | | | |
|---|---|---|---|---|
| 5,888,085 A | * | 3/1999 | Meyerhoefer | H01R 4/2433 439/188 |
| 6,026,160 A | * | 2/2000 | Staber | H04Q 1/028 379/413.03 |
| 6,229,890 B1 | * | 5/2001 | Kerr | H04M 1/0293 379/413 |
| 8,139,761 B2 | | 3/2012 | Vo et al. | |
| 2006/0153516 A1 | * | 7/2006 | Napiorkowski | G02B 6/445 385/135 |
| 2014/0273649 A1 | * | 9/2014 | Smith | H01R 13/703 439/638 |

* cited by examiner

*Primary Examiner* — Solomon G Bezuayehu
(74) *Attorney, Agent, or Firm* — Tamika A. Crawl-Bey

(57) ABSTRACT

A method of providing a telecommunications service using a network interface device (NID) is provided. The method includes connecting a provider line to one or more protector assemblies connected to a ground bar and configured to conduct current surges from the NID to ground. The one or more protector assemblies are electrically connected to an insulation displacement connector (IDC) module. An outgoing jack module wire is connected to the IDC module by inserting the outgoing jack module wire into a wire insertion hole of the IDC module to receive signals from the provider line. The outgoing jack module wire is electrically connected to a jack module outside the NID thereby providing a demarcation point. An incoming jack module wire is electrically connected to the jack module for carrying signals back to the NID.

12 Claims, 5 Drawing Sheets

NETWORK INTERFACE DEVICES HAVING EXTERNAL DEMARCATION POINTS

PRIORITY APPLICATION

This application claims the benefit of priority under 35 U.S.C. § 119 of U.S. Provisional Application Ser. No. 62/043,140 filed on Aug. 28, 2014, the content of which is relied upon and incorporated herein by reference in its entirety.

TECHNICAL FIELD

The present specification generally relates to network interface devices, and more particularly, network interface devices having external demarcation points.

BACKGROUND

Telephone service is provided by a telephone company ("provider") to a number of different customers of the provider, commonly referred to as "subscribers." Each subscriber may purchase as many separate telephone lines as desired and equip his or her home or business with various types of telephone equipment. Subscribers are responsible for proper operation of the telephone equipment and the provider is responsible for proper operation of the telephone network up to the interface between the provider wiring and the subscriber wiring.

Therefore, it is desirable to provide a telephone network interface device ("NID") to serve as a demarcation point between the provider wiring and the subscriber wiring. NIDs serve the function of isolating the provider portion of the system or wiring from that of the respective subscriber. Such isolation is desirable in order to segregate the responsibility for faults or malfunctions that may occur in the respective parts of the system.

In practice, known NID designs are typically mounted to an exterior wall of a house or building. Conventional NIDs generally include a container or housing, the interior of which is divided into a provider portion and a subscriber portion. Provider wiring typically enters the NID and terminates in the provider portion. The provider portion also typically contains protective devices to protect equipment and users from excess voltages. The subscriber wiring typically enters the NID and terminates in the subscriber portion. At least one interconnect apparatus is located between the two portions and generally operates to connect the subscriber wiring to the provider wiring. A test jack may be provided in the interconnect apparatus where the subscriber wiring can be disconnected from the provider wiring.

As services continue to be enhanced, there is a need for other connection schemes between the provider and subscriber wirings.

SUMMARY

In one embodiment, a network interface device (NID) includes a housing including a base including a back wall. A protector assembly is mounted to the back wall configured to receive provider wires from a telecommunications provider line. An insulation displacement connector (IDC) module is mounted to the back wall and is electrically connected to the protector assembly for receiving signals from the telecommunications provider line. The IDC module includes a wire insertion hole configured to receive an outgoing jack module wire for connection with a jack module that provides a demarcation point outside of the NID.

In another embodiment, a method of providing a telecommunications service using a network interface device (NID) is provided. The method includes connecting a provider line to one or more protector assemblies connected to a ground bar and configured to conduct current surges from the NID to ground. The one or more protector assemblies are electrically connected to an insulation displacement connector (IDC) module. An outgoing jack module wire is connected to the IDC module by inserting the outgoing jack module wire into a wire insertion hole of the IDC module to receive signals from the provider line. The outgoing jack module wire is electrically connected to a jack module outside the NID thereby providing a demarcation point. An incoming jack module wire is electrically connected to the jack module for carrying signals back to the NID.

In another embodiment, a method of providing a telecommunications service using a network interface device (NID) is provided. The method includes connecting an outgoing jack module wire to a first insulation displacement connector (IDC) module of the NID by inserting the outgoing jack module wire into a wire insertion hole of the first IDC module. The outgoing jack module wire is electrically connected to a jack module outside the NID thereby providing a demarcation point. An incoming jack module wire is connected to a second IDC module of the NID by inserting the incoming jack module wire into a wire insertion hole of the second IDC module electrically connected to a line module configured to receive subscriber wires of a subscriber line. The incoming jack module wire is electrically connected to the jack module outside the NID.

In another embodiment, a method of providing a telecommunications service using a network interface device (NID) is provided. The method includes connecting a provider line to one or more protector assemblies connected to a ground bar that is configured to conduct current surges from the NID to ground. The one or more protector assemblies may be electrically connected to an insulation displacement connector (IDC) module. An outgoing jack module wire may be connected to the IDC module by inserting the outgoing jack module wire into a wire insertion hole of the IDC module to receive signals from the provider line. The outgoing jack module wire may be electrically connected to a second IDC module inside the NID. The IDC module is connected to a subscriber bridge that is configured to provide a demarcation point inside the NID.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
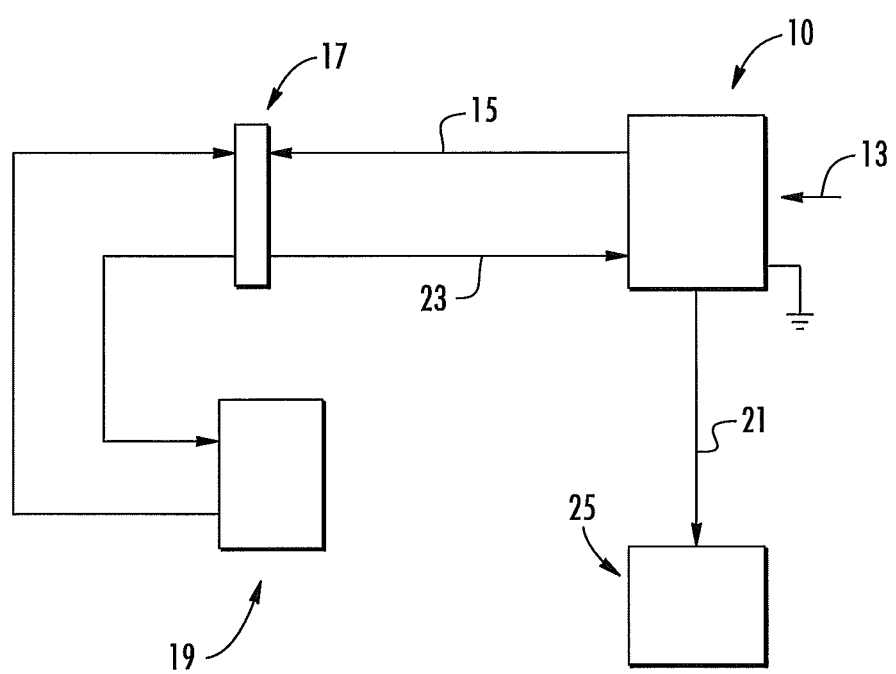
FIG. 1 is a schematic view of a system and method of delivering a telecommunications service using a network interface device according to one or more embodiments shown and described herein.

Embodiments described herein generally relate to network interface devices (NIDs) having external demarcation points. With reference to FIG. 1, NIDs 10 may provide a number of interconnect devices that are used to connect provider wiring to subscriber wiring. For example, the provider wiring 13 may enter the NID 10 and be connected to a protector assembly. Instead of then being connected to the subscriber wiring 21 through a line module, the provider wiring exits the NID at 15 and can be connected to a jack module 17 (e.g., in the form of a wall-plate) that is located within the house of the subscriber. For voice only services, for example, a jumper may connect two ports on the jack module 17, which can send signals directly back to the line module in the NID 10. For enhanced services (e.g., data, video, etc.) another device 19, such as a gateway or modem, can connect to one port and the attached device can connect back to a second port on the jack module to send signals back along line 23 to the line module in the NID 10. This jack module 17 may serve as a demarcation point that is external of the NID 10 and the subscriber wiring 21 may then be connected to the line module. The subscriber wiring 21 can be connected to the NID 10 to provide signals to an external device 25, such as a telephone.

In some embodiments, the NID 10 may be used in conjunction with fiber-to-the-premises (FTTP) systems. For example, input of services may be provided by a fiber, going into the house via an optical network terminal (ONT). The fiber could be routed though the NID 10, a fiber transition housing (FTH) or through a wall.

Throughout this description, positional terms, such as left, right, top, bottom, front, rear, side, etc., and relative terms, such as larger, smaller, nearer, farther, etc., are utilized herein for purposes of explanation only, and as such, should not be construed as limiting the description or the appended claims in any manner. The NIDs described herein may be capable of accommodating various examples of line modules and protectors now known or hereafter devised. The NIDs shown and described herein may be particularly well suited for installations in which restricted access to terminating equipment and wiring connections belonging to the provider is desired.

Figure 2:
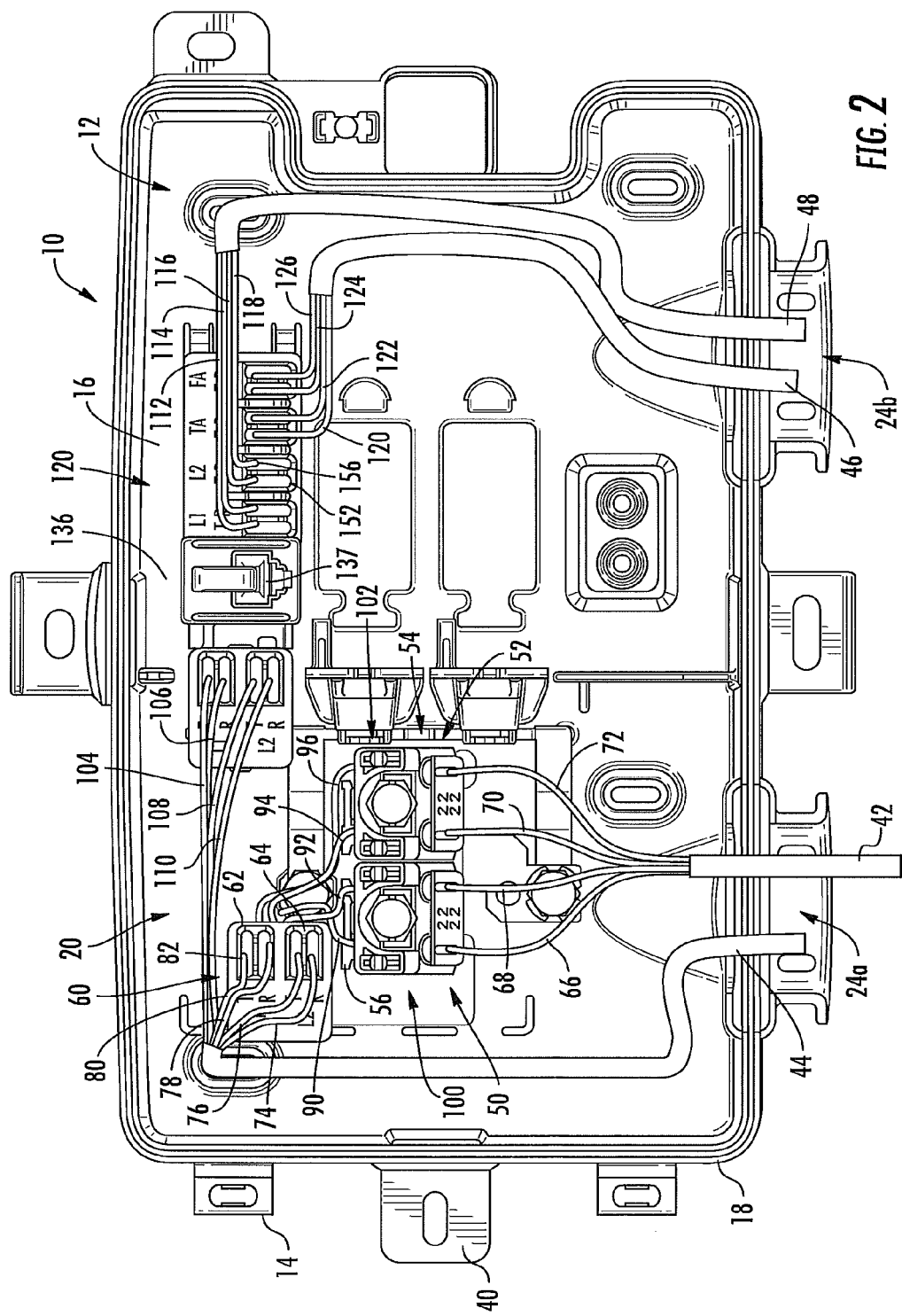
FIG. 2 is a plan view of the network interface device of FIG. 1 according to one or more embodiments shown and described herein.

Referring to FIG. 2, the NID 10 is shown with a protective cover removed, which can be removably connected to a base 12 thereby forming an enclosure. In some embodiments, the protective cover may be hingedly connected to the base 12 at hinge connectors 14. The protective cover may or may not be completely removable from the base 12. The base 12 may be generally rectangular in shape and the base 12 and outer cover may be formed of any suitable material, such as one or more of sheet metal and/or a molded plastic, such as acrylonitrile butadiene styrene (ABS), polyvinyl chloride (PVC), polyethylene, polypropylene, polycarbonate, or polybutylene terephthalate (PBT). Since the base 12 may be affixed to the outside of a building or the like it may be constructed from a low cost ABS- or PVC-type material having desired properties. Further, as the outer cover is attached to the base 12 and is exposed to various stresses during operation, i.e. opening and closing, it may be constructed from a PBT-type material.

The base 12 includes a back wall 16 and a perimeter wall 18 extending outwardly from the back wall 16 along its periphery. The back wall 16 and the perimeter wall 18 of the base 12 define an interior cavity 20 for receiving the terminating equipment and wiring connections housed within the NID 10. The perimeter wall 18 preferably extends from the back wall 16 and has a recess formed at the bottom thereof to form entry/exit ports 24.

The entry/exit ports 24 are in communication with the interior cavity 20 defined by the base 12 to permit provider and/or subscriber lines to be routed into (and/or out of) the NID 10. The NID 10 may be provided with any convenient number of entry/exit ports 24 operable for receiving any number of provider or subscriber lines. The NID 10 may be provided with at least a first port 24a for receiving a provider line from a communications network and a second port 24b for receiving a subscriber line from a subscriber premises. The entry/exit ports 24 may be provided with a removable seal or cap. In some embodiments the entry/exit ports 24 may be provided with a sealing member (e.g., a grommet) to prevent contaminants, such as moisture, dirt, dust, and infestations, from entering the NID 10 when the entry/exit port 24 is not in use or when a provider or subscriber line is utilized that is smaller in diameter than the entry/exit port 24. As will be described below, more than one provider line may be routed through the first port 24a to carry signals out of the NID 10 and to the jack module 17 (FIG. 1), providing a demarcation point outside of the NID 10.

The base 12 may further include one or more mounting structures 40 for mounting the NID 10 to a pole, wall or other building structure at the subscriber premises. The NID 10 may be mounted outside the subscriber premises and the outer cover locked on the base 12 to prevent unauthorized access to the terminating equipment and the wiring connections housed within the NID 10. Note that there may be a plurality of mounts 40 such that NID 10 can be mountable to a variety of surfaces and in different orientations.

Referring still to FIG. 2, provider lines 42 and 44 pass through the entry/exit port 24a and subscriber lines 46 and 48 pass through entry/exit port 24b. The NID 10 is capable of accommodating various interconnect apparatuses for connecting the provider lines 42 and 44 to the subscriber lines 46 and 48. In this example, the provider line 42 is electrically connected to protector assemblies 50 and 52 that are in contact with a ground bar 54 that or snaps and locks to an adapter plate 56. The protector assemblies 50 and 52 can conduct over-voltages current surges carried by the communications network to a grounding box as the grounding box is connected to earth ground upon installation of the NID 10. Although the embodiment shown in FIG. 2. shows two protector assemblies (50 and 52), it is contemplated that the NID can have more or less than two protector assemblies.

Figure 3:
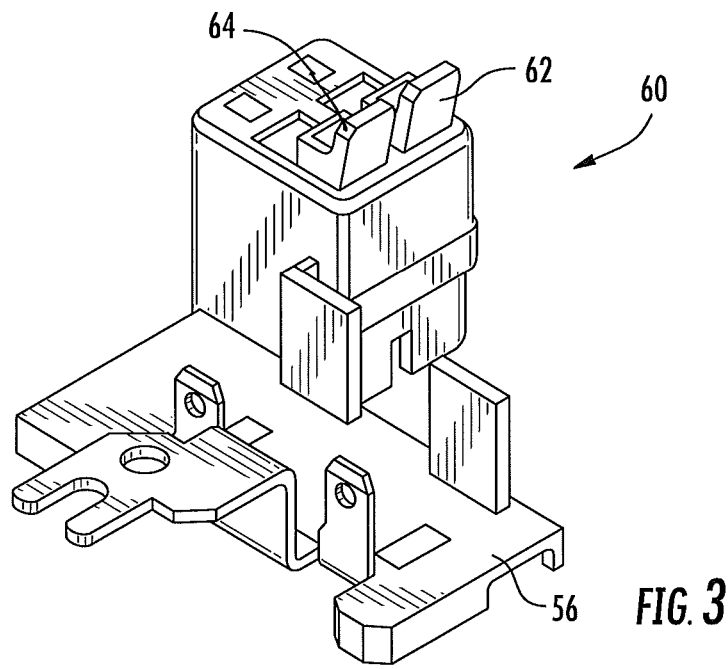
FIG. 3 illustrates an insulation displacement connector module mounted on an adapter plate for use in the network interface device of FIG. 2 according to one or more embodiments shown and described herein.
Figure 4:
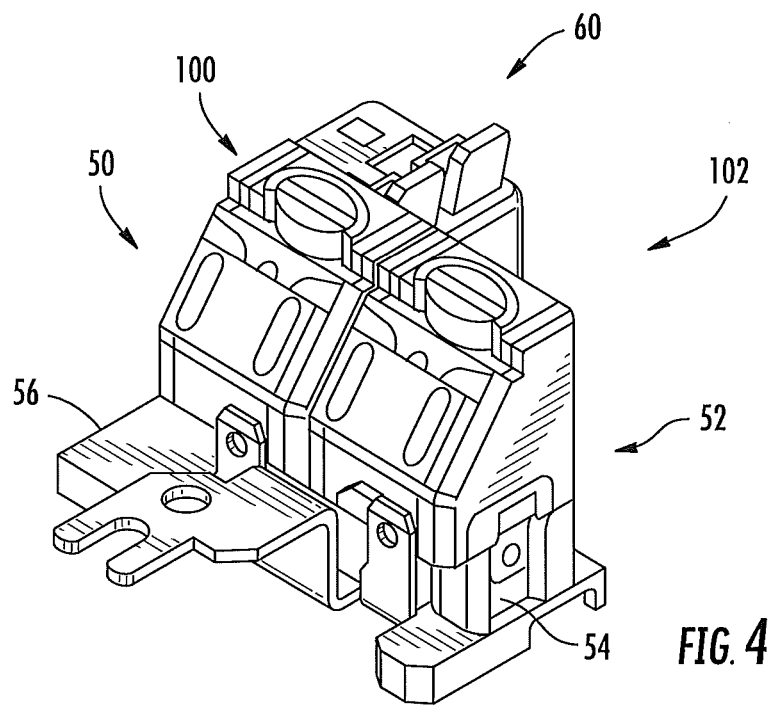
FIG. 4 illustrates the insulation displacement connector module of FIG. 3 mounted along with a pair of protector assemblies according to one or more embodiments shown and described herein.

Referring also to FIGS. 3 and 4, an insulation displacement connector (IDC) module 60 may also be mounted to the adapter plate 56. In other embodiments, the adapter plate may be integrated into the IDC module 60. The IDC module 60 may include actuating arms 62 and 64 for electrically connecting provider wires 66, 68, 70 and 72 connected to the protector assemblies 50 and 52 to outgoing jack module wires 74, 76, 78 and 80. In operation, the actuating arms 62 and 64 are placed in the "disconnect" position and the jack module wires 74, 76, 78 and 80 are inserted into a wire insertion holes 82 of the corresponding IDC module 60. The actuating arms may then be moved from the "disconnect" position to the "connect" position to force the outgoing jack module wires 74, 76, 78 and 80 into engagement with the IDC module 60 and thereby electrically connect the outgoing jack module wires 74, 76, 78 and 80 and provider wires 66, 68, 70 and 72 via connecting wires 90, 92, 94 and 96. Various IDC module and protector assembly details can be found in U.S. Pat. No. 8,139,761, assigned to Corning Cable Systems, the details of which are hereby incorporated by reference in their entirety. In some embodiments, the connecting wires 90, 92, 94 and 96 may be permanently connected to the IDC module 60 and/or protector assemblies 50 and 52 (e.g., via stuffer assemblies 100 and 102). In some embodiments, a gel or potting compound may be used to cover internal connections and provide environmental protection. In this way, no tools may be needed to connect the provider wires 66, 68, 70 and 72 to the outgoing jack module wires 74, 76, 78 and 80 once the provider wires 66, 68, 70 and 72 are connected to the protector assemblies 50 and 52.

Referring again to FIG. 2, the outgoing jack module wires 74, 76, 78 and 80 are connected to incoming jack module wires 104, 106, 108 and 110 via the jack module. The jack module may be, for example, a wall plate that is mounted externally of the NID 10, within the subscriber's premises. The jack module may include one port that is connected to the outgoing jack module wires 74, 76, 78 and 80 and another port that is connected to the incoming jack module wires 104, 106, 108 and 110. For voice only services, a jumper may be used to connect the ports, which can send the provider signal directly back to the NID 10 via the incoming jack module wires 104, 106, 108 and 110. For enhanced services (e.g., data, video, etc.) another device, such as a gateway or modem, can connect to one port and connect back to the second port on the jack module, which can send only the POTS or VoIP-to-POTS back to the NID 10.

In accordance with another embodiment, the outgoing jack module wires 74, 76, 78 and 80 may be connected to incoming jack module wires 104, 106, 108 and 110 directly. In this embodiment, the demarcation point is located within the NID at the line module 120 shown in FIG. 5. This allows the NID to be pre-installed to provide standard POTS until the telephone company installs with a jack module within the subscriber's premises.

Figure 5:
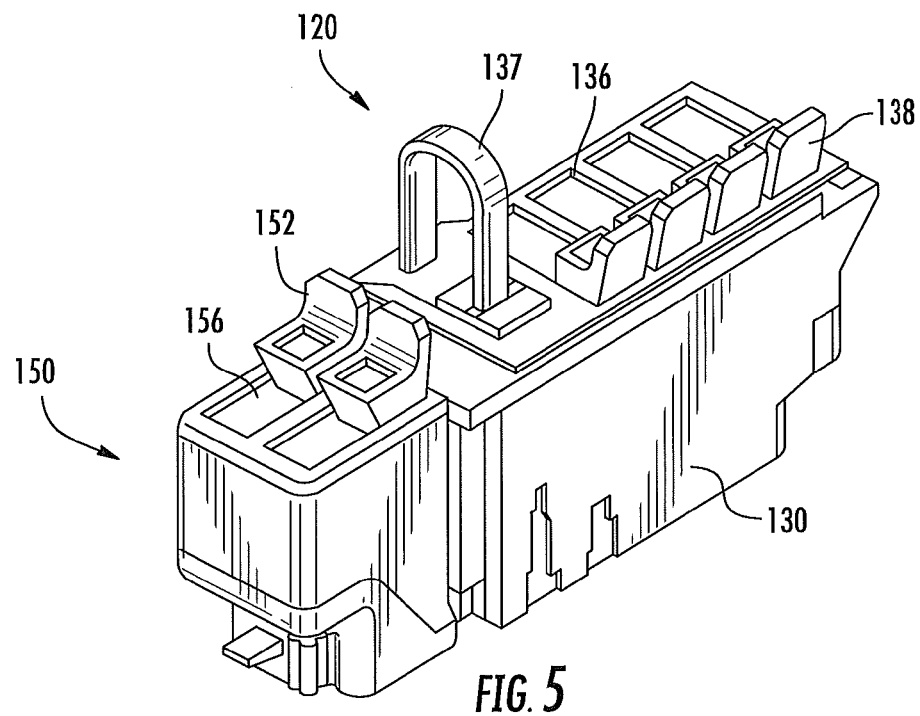
FIG. 5 illustrates a line module with an insulation displacement connector module mounted directly thereon for use in the network interface device of FIG. 2 according to one or more embodiments shown and described herein.
Figure 6:
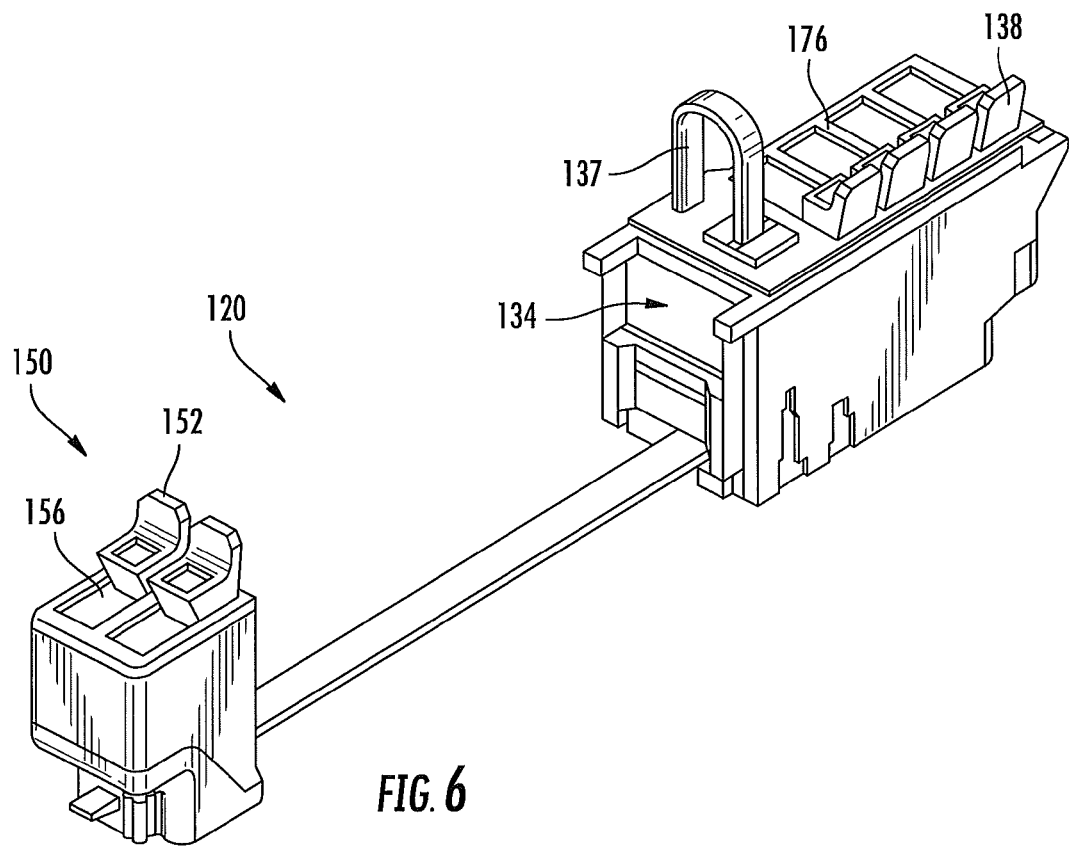
FIG. 6 illustrates another embodiment of a line module with an insulation displacement connector module disconnected from but electrically connected thereto according to one or more embodiments shown and described herein.

The incoming jack module wires 104, 106, 108 and 110 are connected to subscriber wires 112, 114, 116, 118 and 120, 122, 124 126 via a line module 120. While a line module is shown, any suitable terminating device may be used to connect the incoming jack module wires 104, 106, 108 and 110 and subscriber wires 112, 114, 116, 118 and 120, 122, 124 126. Referring to FIGS. 5 and 6, the line module 120 generally includes a base 130 and a customer bridge 134 mounted on the base 130 (or integrated with the base 130). The customer bridge 134 may be referred to as an interconnect module, a connector module, or a wiring module. As used herein, the term "customer bridge" is intended to include any apparatus for terminating wiring in a communications network, including but not limited to, an interconnect module, a connector module, a line module, a wiring module, or a customer bridge.

Generally, the customer bridge 134 may include a cover 136 that is movable between a first, opened position and a second, closed position. In some embodiments, the cover 136 may be provided with a plug 137 that engages a jack formed on the upper surface of the base 130 when the cover is in the closed position. The jack can include, for example, test contacts disposed thereon that engage the contacts of an RJ-11 plug of a conventional telephone handset to test for the presence of a telephone "dial tone" on the communications network. In some embodiments, presence of the telephone dial tone may be tested at the jack module.

The customer bridge 134 houses at least one IDC and a corresponding actuating arm 138 for electrically connecting the subscriber wiring to the IDC, and thus, to the line module 120. The actuating arm 138 can be placed in the disconnect position and the subscriber line is inserted into a wire insertion hole 140 of the corresponding IDC. The actuating arm 138 is then moved from the disconnect position to the connect position to force the subscriber wiring into engagement with the IDC and thereby electrically connect the subscriber wiring to the customer bridge 134 of the line module 120.

The customer bridge 134 may be provided with any number of wire insertion holes 140, insulation displacement contacts and corresponding actuating arms 138. As shown herein, the customer bridge 134 has a plurality, and more specifically four, pairs of wire insertion holes 140 and insulation displacement contacts, each pair corresponding to one of the four actuating arms 138. Accordingly, the customer bridge 134 may accommodate, for example, up to four twisted pair tip and ring wires from various subscriber telephone equipment. Two or more conductive members can be provided to electrically connect the insulation displacement contacts housed within the customer bridge 134 to corresponding subscriber tip and ring conductors disposed within the jack formed in the base 130.

The base 130 may be provided with at least one insulation displacement contact and is attached to a second IDC module 150 for electrically connecting the provider lines to the line module 120. As above, the IDC module 150 may include actuating arms 152 for electrically connecting incoming jack module wires 104, 106, 108 and 110 to subscriber wires 112, 114, 116, 118 and 120, 122, 124 126. In operation, the actuating arms 152 are placed in the disconnect position and the incoming jack module wires 104, 106, 108 and 110 are inserted into wire insertion holes 156 of the corresponding IDC module 150. The actuating arms may then be moved from the disconnect position to the connect position to force the incoming jack module wires 104, 106, 108 and 110 into engagement with the IDC module 150 and thereby electrically connect the incoming jack module wires 104, 106, 108 and 110 to subscriber wires 112, 114, 116, 118 and 120, 122, 124 126. IDC module 150 may include a latching feature that allows it to mount to the main ground bar in the NID. This feature allows the IDC module 150 to be installed or removed easily without the use of tools.

Figure 7:
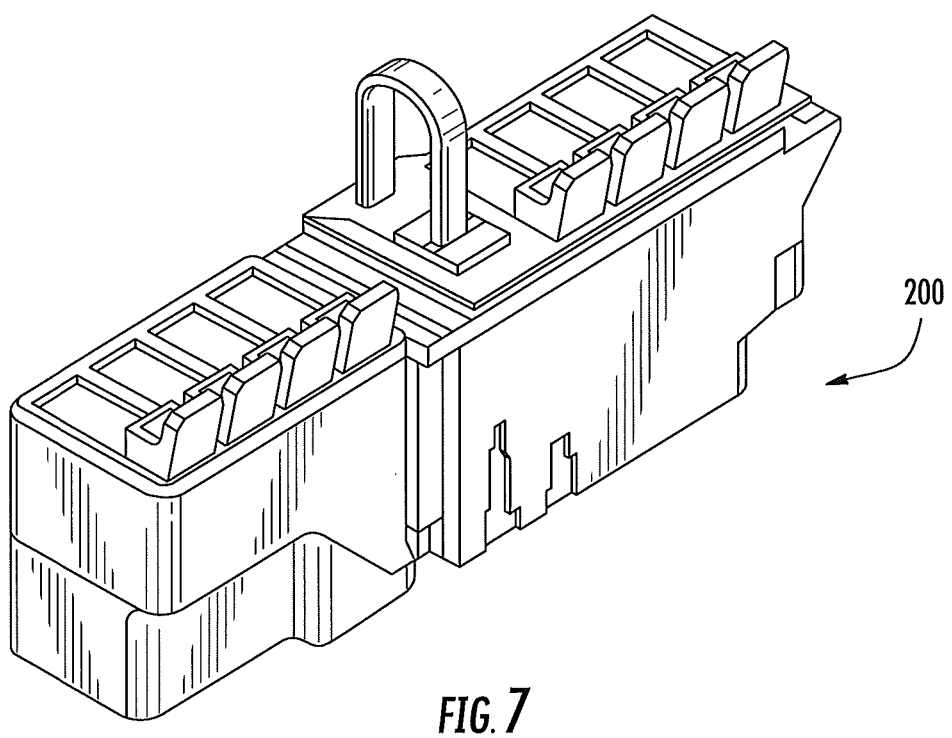
FIG. 7 illustrates another embodiment of a line module with a connected insulation displacement connector module according to one or more embodiments shown and described herein.

The above-described NIDs may provide one or more of the following advantages. For example, the IDC modules can allow for relatively easy connection of wiring to the protector assemblies and/or line module (e.g., without use of tools). The IDC modules can be removable from their respective mounting positions. In some embodiments, the IDC modules may include a release mechanism, such as a lever, for releasing them from the their mount locations. The IDC module 150 may also detach from the line module base 130, as shown in FIG. 6, to allow alternate mounting in other applications with use of adapter. Any of the various connections can be sealed using potting and/or gel for environmental protection. The adapter plate allows for modularity of protector assemblies and IDC modules for ease of installation. While the IDC modules are illustrated having two wire opening pairs, the IDC modules may have more, such as four pairs as illustrated by an IDC module 200 of FIG. 7. The adapter plate may also be used to accommodate other components.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A network interface device (NID), comprising: a housing comprising a base including a back wall; a protector assembly mounted to the back wall configured to receive provider wires from a telecommunications provider line; an insulation displacement connector (IDC) module mounted to the back wall and electrically connected to the protector assembly for receiving signals from the telecommunications provider line, and, wire insertion hole included in the IDC module, wherein the wire insertion hole is configured to receive an outgoing jack module wire for connection with a jack module such that the jack module provides a demarcation point positioned on the outside of the NID; and
a line module configured to connect a subscriber line to the provider line, wherein the IDC module is a first IDC module, the NID further comprising a second IDC module electrically connected to the line module, the second IDC module including a wire insertion hole configured to receive an incoming jack module wire that delivers signals from the provider line.

2. The NID of claim 1, further comprising connecting wires that electrically connect the protector assembly and the IDC module.

3. The NID of claim 1, wherein the IDC module and the protector assembly are mounted together on an adapter plate.

4. The NID of claim 1, comprising at least one or more protector assemblies mounted together with the IDC module on an adapter plate.

5. The NID of claim 1, further comprising a stuffer assembly that electrically connects the provider line to the protector assembly.

6. A method of providing a telecommunications service using a network interface device (NID), the method comprising: connecting a provider line to one or more protector assemblies connected to a ground bar and configured to conduct current surges from the NID to ground, wherein the one or more protector assemblies are electrically connected to an insulation displacement connector (IDC) module; connecting an outgoing jack module wire to the IDC module by inserting the outgoing jack module wire into a wire insertion hole of the IDC module to receive signals from the provider line, and electrically connecting the outgoing jack module wire to a jack module positioned outside the NID providing a demarcation point via the jack module such that the demarcation point is positioned outside the NID;

and electrically connecting an incoming jack module wire to the jack module positioned outside of the NID for carrying signals back to the NID;

and a line module connecting a subscriber line to the provider line, wherein the IDC module is a first IDC module, the NID further comprising a second IDC module electrically connecting to the line module, the second IDC module including a wire insertion hole receiving the incoming jack module wire that delivers signals from the provider line.

7. The method of claim 6, wherein the IDC module is a first IDC module, the method further comprising connecting the incoming jack module wire to a second IDC module electrically connected to a line module configured to receive subscriber wires of a subscriber line.

8. The method of claim 6, further comprising electrically connecting the one or more protector assemblies to the IDC module.

9. The method of claim 8, wherein the step of electrically connecting the one or more protector assemblies to the IDC module is performed before mounting the NID to a building.

10. The method of claim 6, further comprising mounting the one or more protector assemblies and the IDC module together on an adapter plate.

11. The method of claim 6, further comprising mounting at least two protector assemblies and the DC module together on an adapter plate.

12. The method of claim 6, wherein the step of connecting the provider line to the one or more protector assemblies includes using a stuffer assembly to connect the provider line to the one or more protector assemblies.

* * * * *

UNITED STATES PATENT AND TRADEMARK OFFICE
CERTIFICATE OF CORRECTION

PATENT NO. : 10,187,515 B2
APPLICATION NO. : 14/836161
DATED : January 22, 2019
INVENTOR(S) : Robert Alexander Crane et al.

Page 1 of 1

It is certified that error appears in the above-identified patent and that said Letters Patent is hereby corrected as shown below:

In the Claims

In Column 8, Line 51, Claim 11, delete "DC" and insert -- IDC --, therefor.

Signed and Sealed this
Seventeenth Day of December, 2019

Andrei Iancu
*Director of the United States Patent and Trademark Office*